United States Patent
Guzman et al.

(10) Patent No.: US 11,781,694 B2
(45) Date of Patent: Oct. 10, 2023

(54) CLAMPED SADDLE FOR DIRECTIONAL HOT-TAPPING TUBULARS

(71) Applicant: SAUDI ARABIAN OIL COMPANY, Dhahran (SA)

(72) Inventors: Julio C. Guzman, Dhahran (SA); Adib A. Al-Mumen, Dammam (SA); Hussein M. Haleimi, Al Mubarraz (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 80 days.

(21) Appl. No.: 17/648,261

(22) Filed: Jan. 18, 2022

(65) Prior Publication Data

US 2023/0228357 A1 Jul. 20, 2023

(51) Int. Cl.
| | |
|---|---|
| *F16L 41/06* | (2006.01) |
| *F16L 17/08* | (2006.01) |
| *E21B 29/10* | (2006.01) |
| *F16L 17/04* | (2006.01) |

(52) U.S. Cl.
CPC ............. *F16L 41/06* (2013.01); *E21B 29/10* (2013.01); *F16L 17/04* (2013.01); *F16L 17/08* (2013.01)

(58) Field of Classification Search
CPC . F16L 41/06; F16L 17/04; F16L 17/08; E21B 29/10
See application file for complete search history.

(56) References Cited

U.S. PATENT DOCUMENTS

| 4,428,601 A | 1/1984 | Rice et al. | |
|---|---|---|---|
| 5,694,971 A * | 12/1997 | Wilcock | F16L 41/06 408/137 |
| 8,028,711 B2 | 10/2011 | Ahlen et al. | |

(Continued)

FOREIGN PATENT DOCUMENTS

| FR | 968700 A | 12/1950 |
|---|---|---|
| GB | 2460470 A | 12/2009 |
| GB | 2589601 A | 6/2021 |

OTHER PUBLICATIONS

"3 in Double Bale Ductile Iron Body Saddle Clamp;" Jan. 14, 2022; Retrieved from the Internet: URL: https://www.grainger.com/product/SMITH-BLAIR-3-in-Double-Bale-Ductile-Iron-3EUC3 (1 page).

*Primary Examiner* — Kevin R Barss
(74) *Attorney, Agent, or Firm* — Osha Bergman Watanabe & Burton LLP (57) ABSTRACT

A clamp system for hot-tapping tubulars includes a saddle having a saddle body with an inner surface, an outer surface, and an opening extending from the inner surface to the outer surface, a metal protrusion extending from the inner surface of the saddle body to provide a metal seal, an elastomer seal coupled to the inner surface of the saddle body adjacent to the metal protrusion, and a nipple integrally formed with the saddle body and extending outwardly from the outer surface of the saddle body, the nipple positioned over the opening of the saddle body, and a clamp having a nipple opening configured to receive the nipple, the clamp formed separately from the saddle. A method includes positioning the saddle on a tubular and assembling the clamp around the saddle and the tubular including inserting the nipple through the nipple opening formed in the clamp.

20 Claims, 5 Drawing Sheets

(56) References Cited

U.S. PATENT DOCUMENTS

| | | |
|---|---|---|
| 8,534,306 B2 | 9/2013 | Ayers et al. |
| 9,091,383 B2 | 7/2015 | Cenac et al. |
| 9,353,595 B2 | 5/2016 | Duncan et al. |
| 10,989,348 B2 | 4/2021 | Restivo et al. |
| 2002/0067040 A1* | 6/2002 | Marandi ................ F16L 41/06 285/197 |
| 2005/0241694 A1* | 11/2005 | Sayers ................... F16L 41/06 137/318 |
| 2008/0309072 A1* | 12/2008 | Dole ...................... F16L 41/06 285/197 |
| 2022/0307641 A1* | 9/2022 | Qasim ................. F16L 55/105 |

* cited by examiner

CLAMPED SADDLE FOR DIRECTIONAL HOT-TAPPING TUBULARS

BACKGROUND

Hot-tapping is a method of making a connection to an existing tubular, piping, or pressure vessel without interrupting the flow or emptying the tubular, piping, or pressure vessel. In other words, hot-tapping allows for a hole to be drilled into existing piping or an existing vessel under pressure while ensuring the pressure and fluids are contained within the existing piping or vessel while the hole is drilled and the piping or vessel is accessed.

Hot-tapping is used in various applications including, for example, water pipelines, offshore pipelines, onshore pipelines, water injection wells, and various oil and gas applications. In certain applications, such as onshore oil wells and power water injection wells where a portion of the casing below the wellhead needs to be hot-tapped, damage to an existing cellar may occur as a result of digging a trench to accommodate a hot-tapping machine. A cellar is a dug-out area that is located below a rig. The dug-out area may be lined with wood, cement, or a large diameter thin-wall pipe. The casing spool and casing head are located in the cellar. The casing may contain high pressure hydrocarbon fluids trapped inside. Therefore, accessing the casing and hot-tapping the casing needs to be performed carefully to reduce risks of the casing bursting.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a clamp system for hot-tapping tubulars including a saddle having a saddle body with an inner surface, an outer surface, and an opening extending from the inner surface to the outer surface; a metal protrusion extending from the inner surface of the saddle body to provide a metal seal; an elastomer seal coupled to the inner surface of the saddle body adjacent to the metal protrusion; and a nipple integrally formed with the saddle body and extending outwardly from the outer surface of the saddle body, the nipple positioned over the opening of the saddle body; and a clamp having a nipple opening configured to receive the nipple, the clamp formed separately from the saddle.

In another aspect, embodiments disclosed herein relate to a hot-tapping assembly including a saddle having an inner surface and an outer surface and an opening extending from the inner surface to the outer surface, and a sealing face formed on the inner surface around the opening, the sealing face comprising a metal protrusion extending from the inner surface of the saddle; a nipple integrally formed with the saddle, a first end of the nipple aligned with the opening of the saddle and a second end of the nipple extending from the outer surface of the saddle at a non-perpendicular angle to the outer surface of the saddle; a clamp formed independently from the saddle, the clamp having a nipple opening formed in a section thereof, the clamp configured to surround the saddle and to receive the nipple; a pressure containment arrangement coupled to the nipple; and a hot-tapping machine coupled to the pressure containment arrangement.

In another aspect, embodiments disclosed herein relate to a method including positioning a saddle on an outer surface of a tubular; assembling a clamp around the saddle and the tubular, the assembling comprising inserting an inclined nipple integrally formed on an outer surface of the saddle through an opening formed in the clamp; securing the clamp around the saddle and the tubular with fasteners, the securing comprising providing a force between the saddle and the tubular to provide a seal between a sealing face of the saddle and the tubular; coupling a pressure containment arrangement to the inclined nipple at a non-perpendicular angle with respect to the tubular; and coupling a hot-tapping machine to the pressure containment arrangement at the non-perpendicular angle with respect to the tubular.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, a tubular may refer to any type of pipe or piping, including any type of oilfield pipe, such as drill pipe, casing, production tubing, and pipeline. Embodiments of the present application are applicable to any kind of tubular and therefore the terms "pipe" or "tubular" may be used interchangeably. To the extent that an embodiment is discussing a specific example, a more specific term may be used, such as casing; however, a person of ordinary skill in the art will appreciate that the system and method disclosed in the present application is applicable to any tubular.

In one aspect, embodiments disclosed herein relate to a system and method for hot-tapping tubulars. In particular, embodiments disclosed herein relate to a system for securing a hot-tapping machine to a pipe to be hot-tapped. More specifically, embodiments disclosed herein provide a clamp system for coupling a hot-tapping machine to a pipe that may allow for directional (non-perpendicular) access to the pipe. A clamp system and method of hot-tapping in accordance with embodiments disclosed herein may allow for a hot-tapping machine to be securely and safely coupled to a pipe and for a safer and more efficient hot-tapping operation to be performed.

In another aspect, embodiments disclosed herein relate to a clamp system that includes a saddle and a separate clamp for connecting the saddle to a pipe, tubular, or casing to be hot-tapped. In accordance with one or more embodiments, the saddle of the clamp system provides a seal with the pipe, tubular, or casing and allows for a hot-tapping machine to be coupled to the saddle to hot-tap the pipe, tubular, or casing through the saddle. In one or more embodiments, the hot-tapping machine may access the pipe, tubular, or casing through the saddle at a non-perpendicular angle with respect to an outer surface of the pipe. Accordingly, embodiments disclosed herein may allow for a pipe, tubular, or casing to be hot-tapped from a non-perpendicular angle, such as at an angle from above. Access to the casing, for example, at an angle may allow field crew to connect a pressure containment assembly or arrangement and hot-tapping machine, at an angle, avoiding the need to dig out trenches or damage a well's cellar.

Embodiments disclosed herein also relate to a clamp system and method that provides a saddle with an integrated nipple for connecting to the hot-tapping machine. The saddle with integrated nipple allows for a tubular to be hot-tapped without the need to weld a nipple to a tubular. Thus, embodiments disclosed herein may provide for a safer, more reliable clamp system. Specifically, an exact pressure within a tubular may be unknown. Welding of components, such as nipples or clamps to a tubular such as a casing, may present a risk of high pressure ignition and/or of a casing burst, and therefore, avoiding the need to weld components to the tubular may reduce risks associated with high pressure ignition sources.

In another aspect, embodiments disclosed herein relate to a method of hot-tapping that provides for access to a tubular through an inclined nipple integrated with a saddle, the saddle in sealing engagement with the tubular. More specifically, a clamp system and method disclosed herein provides a saddle configured to be fitted to an outer surface of a tubular and provide a seal between the clamp system and a surface of the tubular to be hot-tapped, the saddle secured in place with a clamp. The integrated inclined nipple of the saddle extends outwardly at a non-perpendicular angle from the tubular or an outer surface of the saddle, through the clamp, and connects to a pressure containment arrangement and a hot-tapping machine to provide for perforation of the tubular and bleeding off of any pressure trapped inside the tubular.

In another aspect, embodiment disclosed herein relate to a clamp system and method for hot-tapping a tubular that allows for pumping of any required treatment material. For example, in one or more embodiments a clamp system and method disclosed herein provides a pressure containment arrangement and a hot-tapping machine coupled to a nipple of a saddle sealed to a casing surface that allows for pumping of a treatment slurry to seal or cure communication with a pressure source (e.g., a subsurface pressure source).

Figure 1:
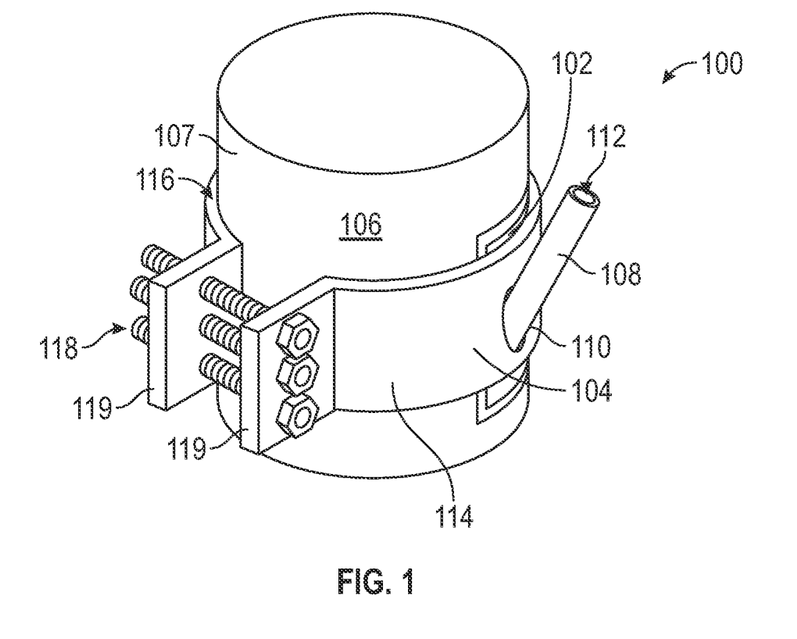
FIG. 1 is a perspective view of a clamp system for hot-tapping tubulars in accordance with embodiments disclosed herein.

Referring now to FIG. 1, a perspective view of a clamp system 100 for hot-tapping tubulars in accordance with embodiments disclosed herein is shown. The clamp system 100 includes a saddle 102 and a clamp 104 for securing the saddle to a tubular 106. The clamp system also includes a nipple 108 coupled to the saddle 102 and extending outwardly from the saddle 102, and therefore the tubular 106. As shown, the nipple 108 extends from the saddle 102 at a non-perpendicular angle with respect to an outer surface the saddle 102 or to a surface of the tubular 106 and through a nipple opening 110 formed in the clamp 104. The nipple 108 provides access 112 for a mill (not shown) of a hot-tapping machine (not shown) coupled to the nipple 108 to extend into the nipple 108 and through an opening (111, FIGS. 3A and 4A) of the saddle body 120 to perforate and hot-tap the tubular 106. The nipple 108 also provides access to a pressure containment arrangement (not shown) to allow for safely bleeding off any pressure trapped inside the tubular 106 during a hot-tapping operation.

Clamp 104 is constructed as a separate or independent piece from the saddle. The independent construction of the clamp 104 allows for the saddle 102 to provide a better seal with the tubular 106 and the clamp 104 to secure the saddle 102 in place. Clamp 104 may include a first portion 114 and a second portion 116, for example, two halves, that may be fastened together by one or more fasteners 118. The fasteners 118 may be screws, bolts, or any other mechanical fastener known in the art. The clamp 104 may be hinged at first side of the first and second portions 114, 116, and may include flanges 119 extending from a second side of the first and second portions 114, 116, such that the clamp 104 may be opened and fitted around the saddle 102 positioned on the tubular 106. The clamp 104 may then be clamped together by fastening the fasteners 118 through the flanges 119, thereby securing the saddle to the tubular 106. In one or more embodiments, clamp 104 may include more or less than two portions, as described in further detail below. As the clamp 104 is fitted around the saddle 102, the clamp 104 and nipple 108 may be orientated such that the nipple fits through and protrudes from the nipple opening 110 formed in the clamp 104.

Figure 2:
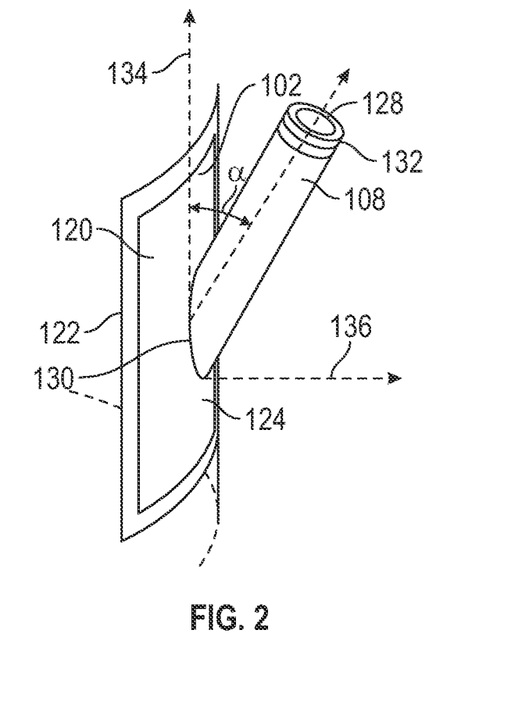
FIG. 2 is a perspective view of a saddle of the clamp system for hot-tapping tubulars of FIG. 1 in accordance with embodiments disclosed herein.

Referring now to FIG. 2, a perspective view of the saddle 102 of FIG. 1 is shown in more detail in accordance with embodiments of the present disclosure. Saddle 102 includes a saddle body 120 having an inner surface 122 and an outer surface 124. The saddle body 120 may be formed from a metal. An opening (111, FIGS. 3A and 4A) is formed in the saddle body 120 extending from the inner surface 122 to the outer surface 124 that corresponds to the nipple 108 extending from the outer surface 124 of the saddle body 120. Specifically, the nipple 108 is coupled to the saddle body 120 such that the nipple is positioned over the opening (111, FIGS. 3A and 4A) of the saddle body 120 and the opening 128 of the nipple 108 is aligned with the opening (111, FIGS. 3A and 4A) of the saddle body 120. The opening (111, FIGS. 3A and 4A) of the saddle body 120 and the opening 128 of the nipple 108 provide access to the tubular 106 (FIG. 1) to be hot-tapped. In one or more embodiments, the saddle 102 has an integrated nipple 108, such that the saddle 102 and the nipple 108 form a single piece, i.e., a unitary construction.

As shown, nipple 108 may be a short piece of pipe coupled to the outer surface 124 of the saddle body 120. In accordance with embodiments disclosed herein, the nipple 108 is formed or built with the saddle body 120 or the nipple 108 is welded to the saddle body 120 to form the single piece. Accordingly, a first end 130 of the nipple 108 is permanently fixed to the saddle body 120. A second end 132 of the nipple 108 is configured to be coupled to the pressure containment arrangement (not shown) and/or the hot-tapping machine (not shown). Thus, the second end 132 of the nipple 108 may include a threaded surface for engagement with a pipe or connection of the pressure containment arrangement (not shown) and/or the hot-tapping machine (not shown). In other embodiments, the pressure containment arrangement (not shown) may be connected to the second end 132 of the nipple 108 via welding.

The nipple 108 is oriented at a non-perpendicular angle from the saddle body 120, e.g., from the outer surface 124 of the saddle body 120. Specifically, the nipple 108 is oriented at an angle α of less than 90 degrees with respect to a vertical axis 134 of the saddle body 120. In one or more embodiments, the angle α between the vertical axis 134 of the saddle body 120 and a center axis of the nipple 108 is between 30 degrees and 45 degrees. In one or more embodiments, the angle α between the vertical axis 134 of the saddle body 120 and a center axis of the nipple 108 is approximately 30 degrees. In other embodiments, the angle α between the vertical axis 134 of the saddle body 120 and a center axis of the nipple 108 is approximately 45 degrees. The nipple 108 is angled up from an axis perpendicular 136 to the saddle body 120 to provide for easier access to the nipple 108, saddle 102, and the tubular 106 to be hot-tapped. Accordingly, embodiments disclosed herein may allow for perforation of tubulars in confined spaces such as inside a cellar of oil and gas wells, without the need to dig out our damage the cellar for access to the tubular with the hot-tapping machine.

Referring back to FIG. 1, the clamp 104 is assembled to the tubular 106 and secured around the saddle 102. As noted above, the clamp 104 includes a nipple opening 110 configured to receive the nipple 108. The nipple opening 110 is a hole formed through a wall or section of the clamp 104 extending from an inner surface of the clamp 104 to an outer surface of the clamp 104. In one or more embodiments, the nipple opening 110 in the clamp 104 may include dimensions approximately equal to or slightly greater than dimensions of an outer diameter of the nipple 108 to allow the nipple to be inserted into the nipple opening 110. In one or more embodiments, an inside surface of the clamp 104 defining the nipple opening 110 of the clamp 104 may be sloped or angled to correspond to the angle α of the nipple 108. The clamp 104 is thus fitted over the saddle 102 and the nipple 108 is inserted into the nipple opening 110 of the clamp 104. The clamp 104 may then be closed around the tubular 106 and fastened, securing the saddle 102 against the tubular 106 with sufficient force to provide a seal between the inner surface 122 (FIG. 2) of the saddle 102 and the tubular 106.

Figure 5:
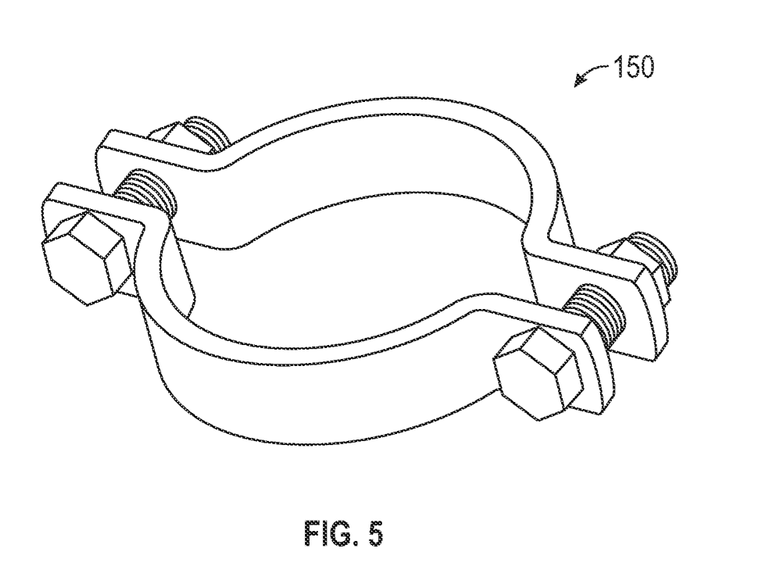
FIG. 5 is a perspective view of a clamp in accordance with embodiments disclosed herein.
Figure 6:
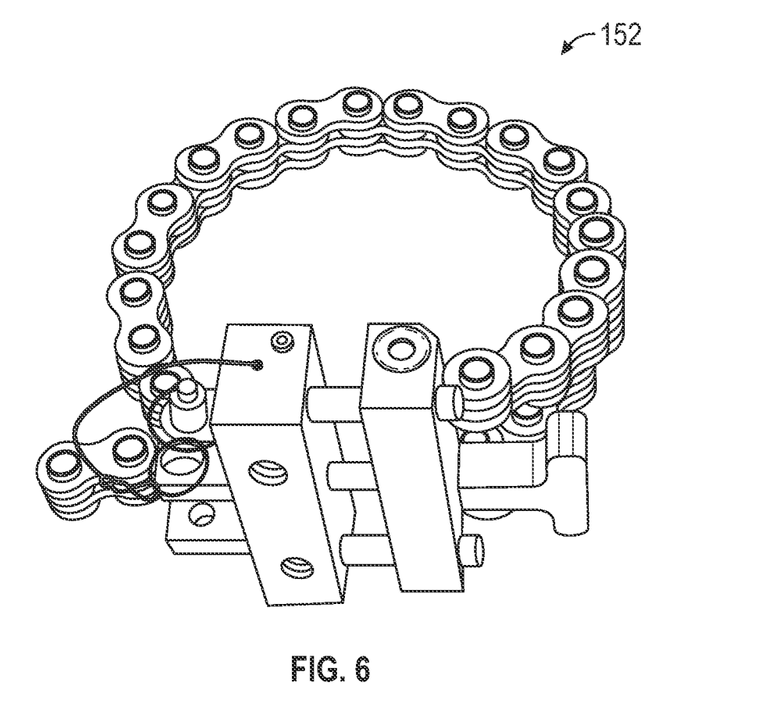
FIG. 6 is a perspective view of a clamp in accordance with embodiments disclosed herein.

In one or more embodiments, the saddle 102 may be secured by other types of clamps 104, such as a strap clamp 150 shown in FIG. 5 or a chain clamp 152 shown in FIG. 6. In such embodiments, the strap clamp 150 or the chain clamp 152 may be assembled around the saddle 102 and the tubular 106 to secure the saddle in place against the tubular 106 and to provide sufficient force to maintain a seal between the saddle 102 and the tubular 106. The strap clamp 150 or the chain clamp 152 may be positioned around the saddle 102 above or below the nipple 108, such that the nipple 108 is still integrally formed or permanently fixed to the saddle 102 and such that the nipple 108 is angled at a non-perpendicular angle with respect to the outer surface of the saddle body 120, as discussed herein. A second strap clamp 150 or chain clamp 152 may also be positioned around the saddle 102, such that one strap clamp 150 or chain clamp 152 is above the nipple 108 and one strap clamp 150 or chain clamp 152 is below the nipple 108. The strap clamp(s) 150 and/or the chain clamp(s) 152 is configured to provide uniform compressive force to provide a sealing force between the saddle 102 and the tubular 106. As shown, the strap clamp 150 may include two halves of a metal band bolted together. The chain clamp 152 may include a section of chain and a locking mechanism to secure two ends of the chain together and tighten the ends with respect to one another. In one or more embodiments, a clamp in accordance with embodiments disclosed herein, such as the clamp 104 shown in FIG. 1, the strap clamp 150 in FIG. 5, and/or the chain clamp 152 in FIG. 6, may include a coating on an interior surface of the clamp to prevent any materials being transferred through the hot-tapping machine (not shown) or the tubular 106, e.g., resins, cementing materials, or other materials, from adhering to the interior surface of the clamp.

The inner surface 122 of the saddle body 120 corresponds to a curvature of an outer surface 107 of the tubular 106. The radius of curvature of the inner surface 122 of the saddle body 120 may be approximately equal to the curvature of the outer surface 107 of the tubular 106; however, in some embodiments, the radius of curvature of the inner surface 122 of the saddle body 120 may be slightly less than or slightly greater the curvature of the outer surface 107 of the tubular 106. The clamp 104 may be assembled around the saddle 102 disposed on the tubular 106 and secure with sufficient force to provide a uniform compressive force to ensure a seal is formed between the saddle 102 and the tubular 106.

Figures 3A, 3B:
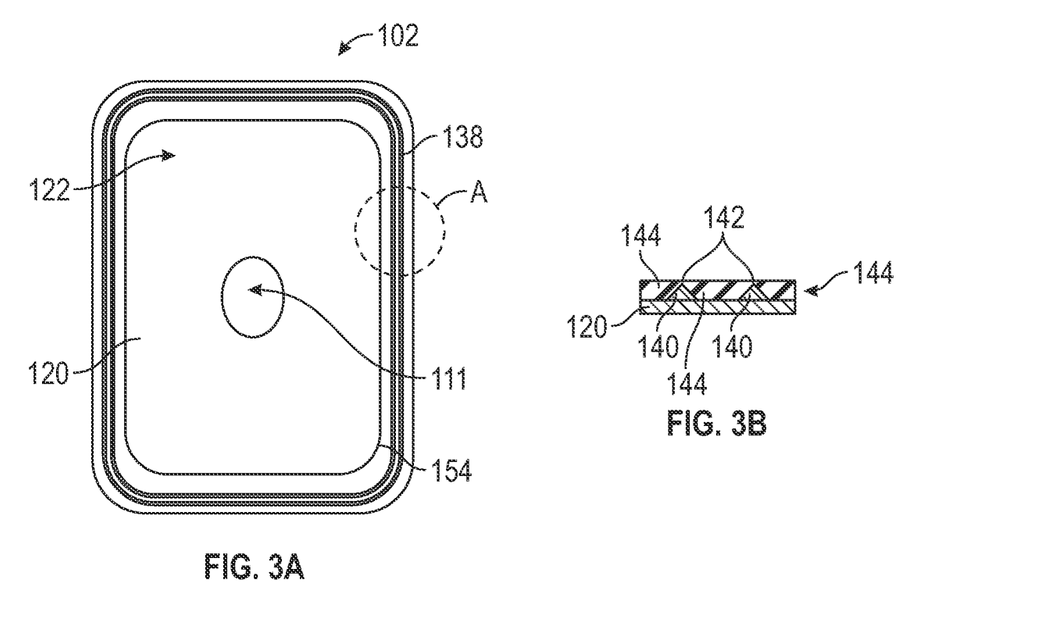
FIG. 3A is a front view of a saddle of a clamp system for hot-tapping tubulars in accordance with embodiments disclosed herein.
FIG. 3B is a partial cross-sectional close-up view of the saddle shown in Section A of FIG. 3A.

In order to provide or enhance a seal between the inner surface 122 (FIG. 2) of the saddle 102, the inner surface 122 of the saddle body 120 may be provided with a sealing face 138, as shown in FIGS. 3A and 3B. The sealing face 138 extends around a peripheral surface of the inner surface 122 of the saddle body 120. The sealing face 138 may extend around the entire peripheral surface defining an outer perimeter of the inner surface 122 of the saddle body 120 to completely seal the area around the opening 111 of the saddle body 120 on the inner surface 122 of the saddle body 120 from the surrounding environment. More specifically, the sealing face 138 provides a seal around the area of the tubular 106 that will be hot-tapped by the hot-tapping machine. Thus, the sealing face 138 provides a seal between the saddle 102 and the tubular 106 to ensure containment of the fluids and pressures between the clamp system 100 and the tubular 106 during a hot-tapping operation. In the embodiment shown in FIG. 3A, the saddle 102 has a generally rectangular shape. Therefore, the sealing face 138 is generally rectangular in shape at the peripheral edge of the saddle body 120, having a first width, a first length, a second width, and a second length and enclosing a central area of the inner surface 122 of the saddle body 120. In other embodiments, the sealing face 138 may have a circular shape, a square shape, a triangular shape, a non-uniform shape, or any other shape. The sealing face 138 may include a metal seal and/or an elastomer seal.

In one or more embodiments, the sealing face 138 may include a metal protrusion 140 extending from the inner surface 122 of the saddle body 120. The metal protrusion may be formed integrally with the saddle body 120. For example, the saddle body 120 may be fabricated from a piece of metal and the metal protrusion 140 may be formed from the same piece of metal as the saddle body 120 is formed. In other embodiments, the saddle metal protrusion 140 may be formed separately from the saddle body 120 and welded to the inner surface 122 of the saddle body 120. In still other embodiments, the metal protrusion 140 may be formed separately from the saddle body 120 as a metal gasket and mechanically coupled to the inner surface 122 of the saddle body 120.

The metal protrusion 140 may extend along a first length, a first width, a second length, and a second width of the inner surface 122 of the saddle body 120 to define a peripheral metal seal of the inner surface 122. Although the embodiment shown in FIG. 3A depicts a metal protrusion extending in length to form a generally rectangular shaped seal, the shape of the peripheral metal seal formed by the metal protrusion may vary without departing from the scope of embodiments disclosed herein. For example, the metal protrusion may extend in length along the inner surface 122 of the saddle body 120 and form a circular shape, triangle shape, square shape, or any other shape peripheral metal seal. Furthermore, while in some embodiments the shape of the seal formed by the metal protrusion 140 may correspond to the shape of the saddle body 120, in other embodiments, the shape of the peripheral metal seal formed by the metal protrusion 140 may be different than the shape of the saddle body 120.

In one or more embodiments, the metal protrusion 140 may include a pointed end 142 extending away from the inner surface 122 for engagement with the tubular 106 (FIG. 1). For example, in one embodiment, in cross-section, the metal protrusion 140 is V-shaped, as shown in a close-up view in FIG. 3B, such that the pointed end 142 of the V-shaped metal protrusion 140 extends away from the inner surface 122 of the saddle body 120. The pointed end 142 of the metal protrusion 140 is configured such that when the saddle 102 is placed on a metal tubular 106 (FIG. 1) and the clamp 104 (FIG. 1) is assembled around the saddle 102 and tubular 106 (FIG. 1), the pointed end 142 of the metal protrusion 140 engages with and is pushed into engaging contact with an outer surface of the tubular 106, thereby forming a metal-to-metal seal.

As shown in FIGS. 3A and 3B, the saddle 102 may include a second metal protrusion 140 extending from the inner surface 122 of the saddle body 120 adjacent to a first metal protrusion 140. Thus, the sealing face 138 may provide a double seal between the saddle 102 and the tubular 106. The second metal protrusion 140 may be formed in a similar manner as the first metal protrusion 140, or the two protrusions 140 may be different from each other, for example, in shape or construction. As shown in FIGS. 3A and 3B, in one or more embodiments, the second protrusion 140 extends along a first length, a first width, a second length, and a second width of the inner surface 122 of the saddle body 120 to define a second peripheral metal seal of the inner surface 122. As shown in FIGS. 3A and 3B, the second metal protrusion 140 is a metal protrusion extending in length to form a generally rectangular shaped seal.

The second metal protrusion 140 may also include a pointed end 142 extending away from the inner surface 122 of the saddle body 120 for engagement with the tubular 106 (FIG. 1). For example, the sealing face 138 may include two metal protrusions 140 that are V-shaped in cross-section, as shown in a partial cross-section close-up view in FIG. 3B, such that the pointed ends 142 of the V-shaped metal protrusions 140 extend away from the inner surface 122 of the saddle body 120. The pointed ends 142 of the two metal protrusions 140 are configured such that when the saddle 102 is placed on a metal tubular 106 (FIG. 1) and the clamp 104 (FIG. 1) is assembled around the saddle 102 and tubular 106 (FIG. 1), the pointed ends 142 of the two metal protrusions 140 engage with and are pushed into engaging contact with the outer surface of the tubular 106, thereby forming a double metal-to-metal seal. One of ordinary skill in the art will appreciate that in other embodiments, the sealing face 138 may include more than three or more metal protrusions 140.

Figures 4A, 4B:
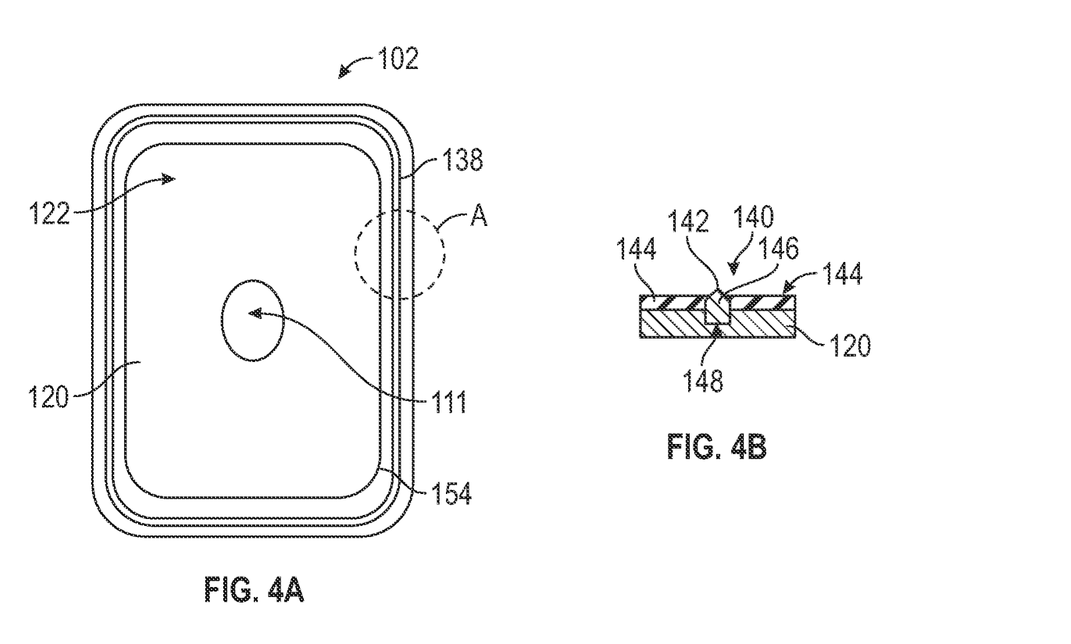
FIG. 4A is a front view of a saddle of a clamp system for hot-tapping tubulars in accordance with embodiments disclosed herein.
FIG. 4B is a partial cross-sectional close-up view of the saddle shown Section A of FIG. 4A.

As discussed above, in some embodiments, the sealing face 138 may include a metal protrusion 140 that is formed separately from the saddle body 120 as a metal gasket and mechanically coupled to the inner surface 122 of the saddle body 120, as shown in FIGS. 4A and 4B. Specifically, in one or more embodiments, the metal protrusion 140 may be a V-shaped ring gasket 146 disposed in a groove 148 formed in the inner surface 122 of the saddle body 120. The V-shaped ring gasket 146 is formed from metal. The V-shaped ring gasket 146 may include a pointed end 142 extending away from the inner surface 122 for engagement with the tubular 106 (FIG. 1). For example, in one embodiment, in cross-section, the pointed end 142 of the V-shaped ring gasket, as shown in a close-up view in FIG. 3B, extends away from the inner surface 122 of the saddle body 120. The pointed end 142 of the V-shaped ring gasket 146 is configured such that when the saddle 102 is placed on a metal tubular 106 (FIG. 1) and the clamp 104 (FIG. 1) is assembled around the saddle 102 and tubular 106 (FIG. 1), the pointed end 142 of the V-shaped ring gasket 146 engages with and is pushed into engaging contact with the outer surface of the tubular 106, thereby forming a metal-to-metal seal.

As noted above, the sealing face 138 may also include an elastomer seal 144, as shown in FIGS. 3A-4B. The metal-to-metal seal provided by the metal protrusion 140, as shown in FIGS. 3A-4B, may provide a primary seal, while the elastomer seal 144 may provide a secondary seal. The elastomer seal 144 may help protect the metal protrusions 140 from any corrosive fluid from contacting the metal protrusions 140 from within or without the saddle 102 sealed to the tubular 106. The elastomer seal 144 may be positioned adjacent the metal protrusion 140. In some embodiments, an elastomer seal 144 may be positioned on either side of the metal protrusion 140, i.e., inwardly laterally adjacent and outwardly laterally adjacent the metal protrusion 140 with respect to a center of the metal protrusion 140 forming the peripheral seal. In embodiments in which the sealing face 138 includes two or more metal protrusions 140, an elastomer seal 144 may be positioned between the two metal protrusions and laterally inside an inwardly disposed metal protrusion 140 of the two metal protrusions and laterally outside an outwardly disposed metal protrusion 140 of the two metal protrusions, for example, as shown in FIG. 3B. Thus, the sealing face 138 may include one, two, three, or more elastomer seals 144. In one or more embodiments, an elastomer seal 144, such an elastomer seal 144 disposed laterally outwardly from the metal protrusions 140, may be positioned around an entire perimeter of the saddle 102 surrounding an area of the tubular 106 in contact with the saddle 102. The elastomer seals may be formed from natural rubber, hydrogenated nitrile butadiene rubber (HNBR), VITON rubber, or similar materials. The elastomer seal 144 may be secured to the face of the saddle body 120 by an adhesive.

With reference to FIGS. 1-4, the sealing face 138, including one or more metal protrusion 140 and one or more elastomer seal 144 as described above with respect to FIGS. 3A-4B, may be coupled to a tubular using a clamp 104 as described herein. The inner surface 122 of the saddle body 120 may be coated to reduce or prevent the saddle from being permanently affixed to the tubular 106 inadvertently while curing materials such as cement or epoxy resins are pumped through the nipple 108 and opening 111 of the saddle 102. For example, a coating 154 may be disposed on the inner surface 122 of the saddle body 120. The coating 154 on the inner surface 122 of the saddle may be an elastomer, such as rubber. The elastomer coating 154 may prevent materials, such as curing materials, being passed through the nipple 108 and the saddle 102 into the tubular 106 from curing or adhering to the inner surface 122 of the saddle 102. Therefore, the saddle 102 is removable from the tubular 106 after the hot-tapping operation is performed.

Figure 7:
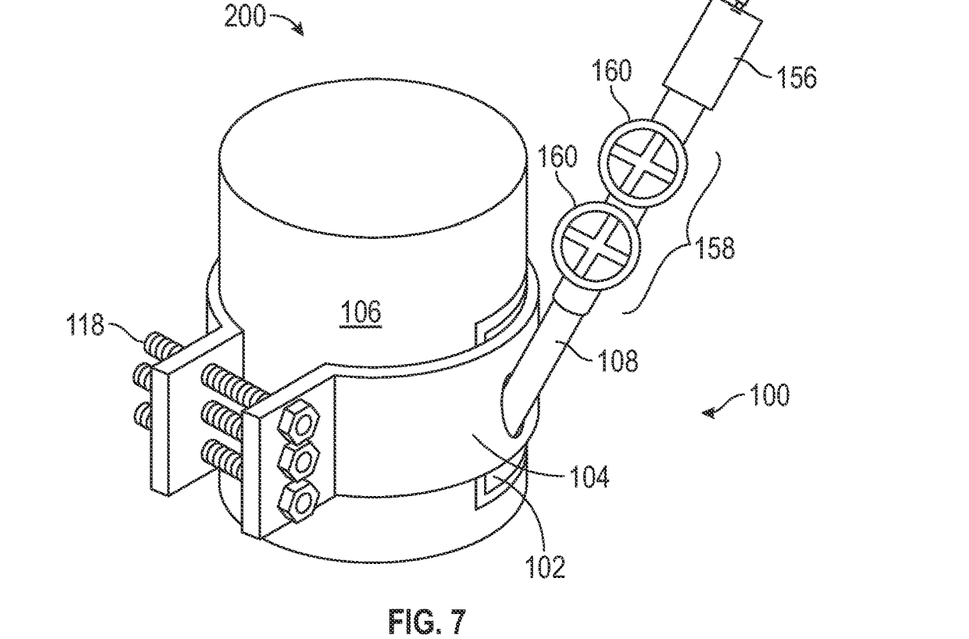
FIG. 7 is a perspective view of a hot-tapping assembly in accordance with embodiments disclosed herein.
Figure 8:
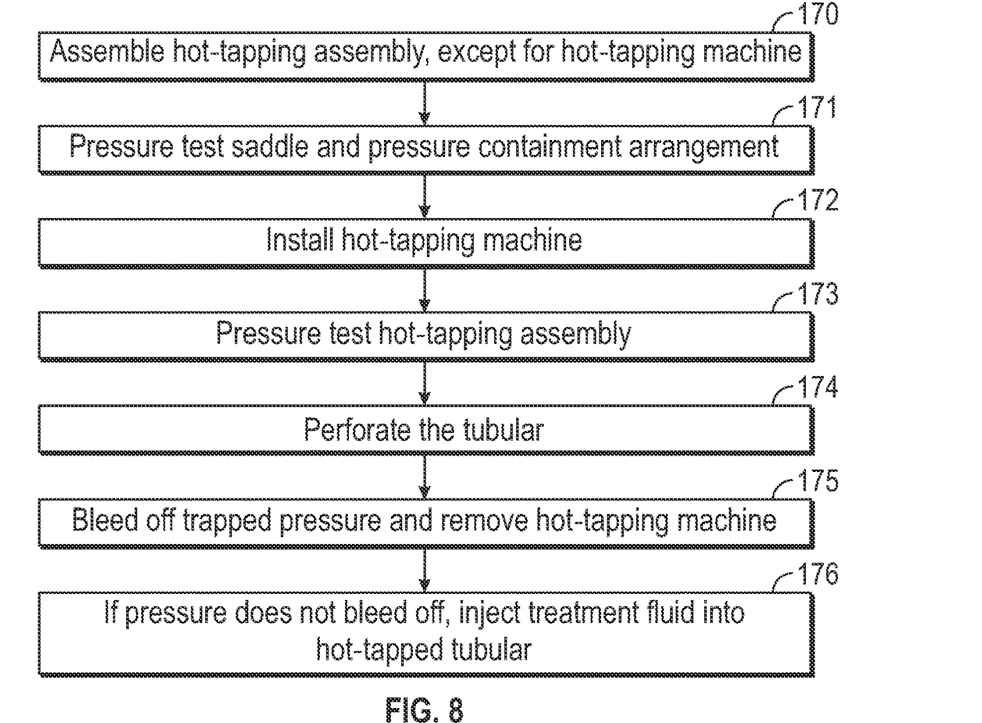
FIG. 8 shows a method of hot-tapping a tubular in accordance with embodiments disclosed herein.
Figure 9:
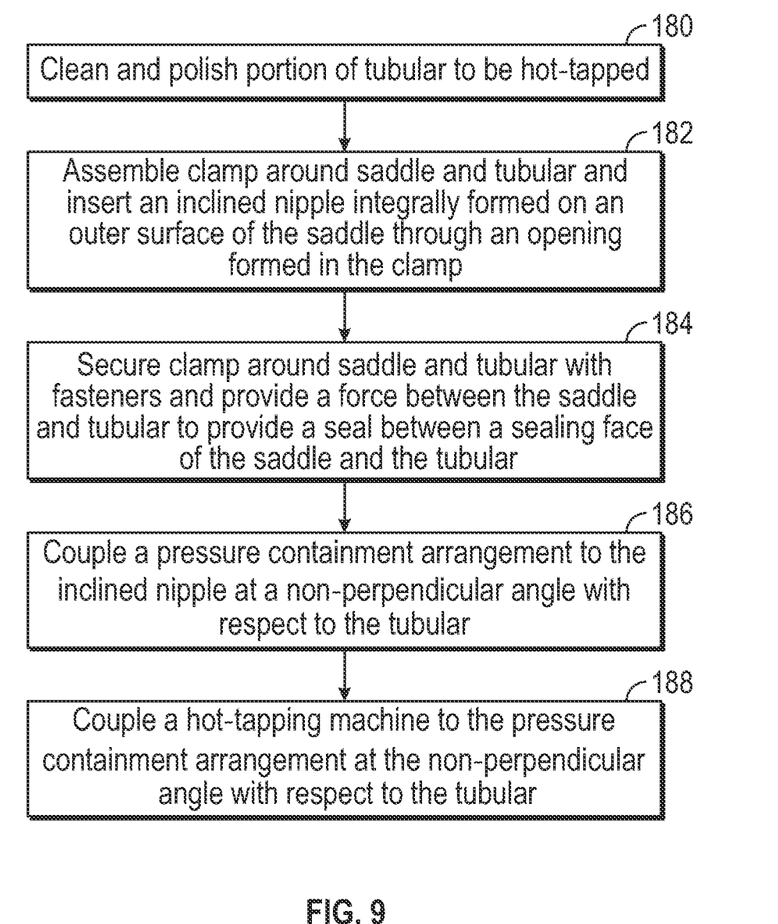
FIG. 9 shows a method of assembling a hot-tapping assembly in accordance with embodiments disclosed herein.

Referring now to FIG. 7, a hot-tapping assembly 200 having a clamp system 100 in accordance with embodiments of the present application is shown with a hot-tapping machine 156 coupled to the tubular 106 to allow for hot-tapping of the tubular 106. The clamp system 100 shown in FIG. 7 is representative of any clamp system 100 disclosed in the present application and any combination of features of clamp systems 100 disclosed herein. The hot-tapping machine 156 is coupled to the nipple 108 with a pressure containment arrangement 158 that is configured to contain and/or bleed off pressure with the tubular 106 and the clamp system 100 to ensure safe operation of the hot-tapping machine 156 and ensure safety of personnel. The pressure containment arrangement 158 allows an operator to isolate any pressure below the hot-tapping machine 156, i.e., outside the hot-tapping machine 156 in the nipple 108, saddle 102, or tubular 106, so that the hot-tapping machine 156 may be disconnected safely after milling a hole in the tubular 106. The pressure containment arrangement 158 may include one or more valves 160, such as full-bore valves or plug valves. A first valve 160 may be coupled to the second end 132 (FIG. 2) of the nipple 108 via threaded connection or via welding. The hot-tapping machine 156 is coupled to the first valve 160 or a second valve 160 coupled to the first valve 160. In some embodiments, the pressure containment arrangement may also include a pressure gauge for monitoring a pressure within the Referring now to FIGS. 7, 8, and 9 together, a method of hot-tapping a tubular 106 in accordance with embodiments disclosed herein is described. FIG. 8 shows a method of hot-tapping a tubular in accordance with embodiments disclosed herein, and FIG. 9 shows a method of assembling a hot-tapping assembly generally, which may be part of the method of hot-tapping the tubular, in accordance with embodiments disclosed herein. First, a hot-tapping assembly 200 is assembled (Block 170). Assembly of the hot-tapping assembly 200, as shown in FIG. 9, may include first cleaning and polishing a portion of the tubular to be hot-tapped, shown at (Block 180). Cleaning and polishing the portion of the tubular to be hot-tapped may ensure a better seal is formed between the saddle 102 and the tubular. The method of assembling next includes positioning the saddle 102 on the outer surface of the tubular 106 on the area to be hot-tapped. The clamp 104 is then assembled around the saddle 102 and the tubular 106 and secured together, shown at Block 182. The clamp is secured with one or more fasteners 118 to secure the saddle 102 to the tubular 106, shown at Block 184. As the clamp 104 is assembled around the saddle 102, the nipple 108 integrally formed with the saddle 102 is inserted through the nipple opening 110 of the clamp 104. The clamp 104 is slid down along the nipple 108 into engagement with the outer surface 124 (FIG. 2) of the saddle 102. The assembly of the hot-tapping assembly also includes fastening the clamp 104, for example by fastening ends of two halves of the clamp 104 with one or more fasteners 118, such as bolts.

As the clamp 104 is fastened, the saddle body 120 is pressed against the tubular 106 to generate a force necessary to push the metal protrusion 140 (or metal protrusions 140) of the sealing face 138 of the saddle 102 into the outer surface of the tubular 106 to create a metal-to-metal seal. The force exerted by the clamp 104 fastened around the saddle 102 and tubular 106 is also sufficient to ensure a seal between the elastomer seal 144 (or elastomer seals 144) and the tubular 106. In one or more embodiments, the force exerted by the clamp 104 on the saddle 102 and tubular 106 may be sufficient such that the metal protrusions 140, e.g., the pointed ends 142 of the V-shaped metal protrusions 140, may slightly deform the outer surface of the outer surface of the tubular 106 to ensure a metal-to-metal seal all around the area of the tubular 106 to be hot-tapped. Additionally, the force exerted by the clamp 104 on the saddle 102 and tubular 106 may be sufficient such that the elastomer seal(s) 144 may slightly extrude to ensure a seal all around the area of the tubular 106 to be hot-tapped. The elastomer seal 144 may also prevent fluids from contacting the metal protrusion (s) 144 to prevent corrosion of sealing surfaces of metal-to-metal seal.

The pressure containment arrangement 158 may then be coupled to the nipple 108, for example, by threadedly engaging a threaded connector to or welding the valve 160 of the pressure containment arrangement 158 to the second end 132 (FIG. 1) of the nipple 108, shown at Block 186. The pressure containment arrangement 158 is configured to provide or bleed-off pressure within the hot-tapping assembly 200. The pressure containment arrangement 158 is also configured to allow pumping of treatment fluid to isolate any subsurface pressure source coming through the tubular 106. The hot-tapping machine 156 is then coupled to the pressure containment arrangement 158 by threadedly engaging the hot-tapping machine 156 to the pressure containment arrangement 158, shown at Block 188.

Due to the unique configuration of the clamp system 100, and in particular, the design of the saddle 102 with a nipple 108 (inclined and integrated with the saddle 102), pressure containment arrangement 158 and the hot-tapping machine 156 (and the associated mill (not shown)) may access the tubular 106 from an angle, such as from above the location of the tubular 106 to be cut.

Before the hot-tapping machine 156 is coupled to the pressure containment arrangement 158, the saddle 102 and pressure containment arrangement 158 may be pressure tested, shown at Block 171, to ensure a proper seal is formed between the saddle 102 and the tubular 106 and that there are no pressure leaks between the connections of the valves 160 of the pressure containment arrangement and the nipple 108. After pressure testing the saddle 102 and pressure containment arrangement 158, the hot-tapping machine 156 may be installed, shown at Block 172, by coupling the hot-tapping machine 156 to the pressure containment arrangement 158. After the hot-tapping assembly 200 is assembled around the tubular 106, and before hop-tapping the tubular 106, the hot-tapping assembly 200 including the connection between the pressure containment arrangement 158 and the hot-tapping machine 156 is pressure tested (Block 173) to ensure that there are no pressure leaks between the connections of the valves 160 and hot-tapping machine 156. The hot-tapping assembly 200 may be pressure tested by increasing a pressure within the hot-tapping assembly 200 and closing the valves of the pressure containment arrangement 158, and monitoring for any changes in pressure within the hot-tapping assembly 200. It is noted that pressure is contained and controlled within the saddle 102, the pressure containment arrangement 158, and the hot-tapping machine 156.

Once the hot-tapping assembly 200 has been pressure tested and passes the pressure test, a milling bit (not shown) coupled to a hot-tapping shaft (not shown) of the hot-tapping machine 156 is extended through the pressure containment arrangement 158, through the nipple 108, through the opening 11 (FIGS. 3A, 4A) in the saddle 102, and into contact with tubular 106 to perforate (Block 174), or cut a hole in, the tubular 106. The mill of the hot-tapping machine 156 may access the tubular 106 from a non-perpendicular angle α (FIG. 2) with respect to the tubular 106. The pressure containment arrangement 158 safely bleeds off any pressure contained inside the tubular 106 as the tubular 106 is perforated, shown at Block 175. The clamp system 100 allows an operator to access the tubular 106 from above. Thus, in one or more embodiments, the clamp system 100 of the present application allow s an operator to connect the pressure containment arrangement 158 and the hot-tapping machine 156 to the clamp system 100, and in particular to the nipple 108 of the saddle 102, without the need for welding a nipple directly to the tubular 106, and without needing to dig a trench in the earth or destroy the well cellar to perform the hot tapping operation. After the hot-tapping operation, the hot-tapping machine may be removed, shown at Block 175, and the tubular secured.

The hot-tapping assembly 200 of the present application may be used first to safely access the tubular 106 with the hot-tapping machine 156 and safely contain and bleed off the subsurface pressure with the pressure containment arrangement 158, and second to inject a treatment fluid to the hot-tapped tubular to seal the damaged or channeled cement. For example, in a normal operating condition, the tubular 106 (for example, a casing) is filled with cement and isolated from any subsurface pressure. However, pressure from underground may find its way to surface inside the tubular in some circumstances, such as when cement deteriorates or when channeling of the cement occurs. In such circumstances, the pressure inside the tubular may not bleed off. If the pressure does not bleed off, then the hot-tapping machine 156 may be removed, while trapping pressure with the pressure containment arrangement 158. Treatment lines and a pump may then be coupled to the pressure containment arrangement 158 and a treatment fluid injected into the hot-tapped tubular, shown at Block 176, to cure a leak (or isolate a pressure source). For example, a treatment fluid such as a cement slurry (oilfield cement class "G" neat or accelerated) or a thermosetting epoxy resin may be forced into the hot-tapped tubular 106 from the pressure containment arrangement 158 and through the saddle 102. These treatment fluids may be injected (Block 176) into the hot-tapped tubular 106, filling the channels or cracks in the cement, and will solidify within and cure the cracks or channels in the existing cement in the tubular 106. The tubular 106 may subsequently be secured.

Embodiments of the present disclosure may provide at least one of the following advantages. A hot-tapping assembly with a clamp system in accordance with embodiments disclosed herein may allow for hot-tapping of a portion of a casing below a wellhead and inside onshore oil and power water injection wells without damaging the existing well cellar and without the need for digging a trench in order to accommodate the hot-tapping machine. Specifically, a clamp system in accordance with one or more embodiments disclosed herein allows angled access to the area of the area of the tubular to be hot-tapped with the hot-tapping machine and pressure containment arrangement so that damage to surrounding structures can be avoided during a hot-tapping operation. Further, a clamp system in accordance with the present disclosure provides for a saddle with an integrally formed nipple for hot-tapping machine access so that a nipple does not need to be directly welded to the tubular as done in conventional systems. By eliminating the need to weld components directly to the tubular, safety of the hot-tapping operation may be improved.

Embodiments of the present disclosure may also provide an improved seal between a saddle of a clamp system for a hot-tapping operation without the need for welding to the tubular directly. A sealing face of a saddle of a clamp system as disclosed herein provides a primary metal-to-metal seal and a secondary elastomer seal between the saddle and the tubular. Additionally, a saddle according to the present disclosure may be coated to advantageously allow for the saddle to be removed from the tubular once the hot-tapping operation and other procedures are completed.

Further, a hot-tapping assembly and method in accordance with the present disclosure also advantageously allow an operator to hot-tap a tubular, remove the hot-tapping machine and then, using the same clamp system and pressure containment arrangement, inject a treatment fluid into the tubular to seal or cure any existing cement inside the tubular.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A clamp system for hot-tapping tubulars comprising:
   a saddle comprising:
      a saddle body with an inner surface, an outer surface, and an opening extending from the inner surface to the outer surface;
      a metal protrusion extending from the inner surface of the saddle body to provide a metal seal;

an elastomer seal coupled to the inner surface of the saddle body adjacent to the metal protrusion; and a nipple integrally formed with the saddle body and extending outwardly from the outer surface of the saddle body, the nipple positioned over the opening of the saddle body; and a clamp having a nipple opening configured to receive the nipple, the clamp formed separately from the saddle.

2. The clamp system of claim 1, wherein the metal protrusion extends from the inner surface of the saddle body and defines an outer perimeter of the saddle body.

3. The clamp system of claim 1, wherein the metal protrusion extends along a first length, a first width, a second length, and a second width of the inner surface of the saddle body, the metal protrusion defining a peripheral metal seal of the inner surface.

4. The clamp system of claim 1, wherein a cross-section of the metal protrusion is V-shaped.

5. The clamp system of claim 4, wherein a pointed end of the V-shaped metal protrusion extends away from the inner surface of the saddle body for engagement with a pipe.

6. The clamp system of claim 1, further comprising a second metal protrusion extending from the inner surface of the saddle body.

7. The clamp system of claim 1, further comprising an elastomer coating disposed on the inner surface of the saddle body.

8. The clamp system of claim 1, wherein the metal protrusion is a V-shaped metal ring gasket positioned in a groove formed in the inner surface of the saddle body.

9. The clamp system of claim 1, wherein a curvature of the inner surface of the saddle body corresponds to a curvature of an outer surface of a pipe.

10. The clamp system of claim 1, wherein the clamp comprises a first portion and a second portion and a fastener for securing the first portion and the second portion together.

11. The clamp system of claim 1, further comprising a pipe, the saddle body of the saddle coupled to the pipe with the clamp, the metal protrusion extending from the inner surface of the saddle body engaged with an outer surface of the pipe to form a metal-to-metal seal.

12. The clamp system of claim 1, wherein the nipple extends outwardly from the outer surface of the saddle body at a non-perpendicular angle.

13. A hot-tapping assembly comprising:

a saddle having an inner surface and an outer surface and an opening extending from the inner surface to the outer surface, and a sealing face formed on the inner surface around the opening, the sealing face comprising a metal protrusion extending from the inner surface of the saddle;

a nipple integrally formed with the saddle, a first end of the nipple aligned with the opening of the saddle and a second end of the nipple extending from the outer surface of the saddle at a non-perpendicular angle to the outer surface of the saddle;

a clamp formed independently from the saddle, the clamp having a nipple opening formed in a section thereof, the clamp configured to surround the saddle and to receive the nipple;

a pressure containment arrangement coupled to the nipple; and a hot-tapping machine coupled to the pressure containment arrangement.

14. The hot-tapping assembly of claim 13, wherein the saddle is secured to a tubular in an area to be hot-tapped with the clamp, the clamp secured around the saddle and the tubular with a fastener.

15. The hot-tapping assembly of claim 14, wherein the metal protrusion of the sealing face has a V-shaped cross-section with a pointed end, the pointed end in sealing engagement with the tubular.

16. The hot-tapping assembly of claim 13, wherein the sealing face comprises and elastomer seal adjacent to the metal protrusion.

17. The hot-tapping assembly of claim 13, wherein the metal protrusion is a metal ring-gasket disposed in a groove formed on the inner surface of the saddle.

18. A method comprising:

positioning a saddle on an outer surface of a tubular;

assembling a clamp around the saddle and the tubular, the assembling comprising inserting an inclined nipple integrally formed on an outer surface of the saddle through an opening formed in the clamp;

securing the clamp around the saddle and the tubular with fasteners, the securing comprising providing a force between the saddle and the tubular to provide a seal between a sealing face of the saddle and the tubular;

coupling a pressure containment arrangement to the inclined nipple at a non-perpendicular angle with respect to the tubular; and coupling a hot-tapping machine to the pressure containment arrangement at the non-perpendicular angle with respect to the tubular.

19. The method of claim 18, wherein the seal between the sealing face of the saddle and the tubular comprises a metal-to-metal seal between a V-shaped metal protrusion on an inner surface of the saddle and the outer surface of the tubular.

20. The method of claim 18, further comprising perforating the tubular with the hot-tapping machine to form a hole in the tubular, and injecting a treatment fluid into the hole in the tubular.

* * * * *